(12) United States Patent
Yang et al.

(10) Patent No.: US 8,068,335 B2
(45) Date of Patent: Nov. 29, 2011

(54) FIXING DEVICE

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 206 days.

(21) Appl. No.: 12/646,876

(22) Filed: Dec. 23, 2009

(65) Prior Publication Data

US 2011/0051356 A1    Mar. 3, 2011

(30) Foreign Application Priority Data

Aug. 31, 2009 (CN) .......................... 2009 1 0306386

(51) Int. Cl.
*G06F 1/16* (2006.01)

(52) U.S. Cl. .............. 361/679.33; 439/159; 248/346.03; 312/334.27

(58) Field of Classification Search ............. 248/220.21, 248/346.03, 205.8, 121, 27.8; 439/153, 159; 361/679.39, 679.01, 679.49, 679.33, 679.27, 361/679.35, 679.58, 679.55, 679.46, 679.41; 312/334.46, 223.1, 223.2, 333, 334.27, 278, 312/348.4; 174/384, 365; 360/99.06, 133

See application file for complete search history.

(56) References Cited

U.S. PATENT DOCUMENTS

2008/0123280 A1* 5/2008 Chen et al. .................... 361/685
2011/0031362 A1* 2/2011 Chang ...................... 248/220.21

* cited by examiner

*Primary Examiner* — Hung Duong
(74) *Attorney, Agent, or Firm* — Altis Law Group, Inc.

(57) ABSTRACT

A fixing device includes a loading assembly and a hook assembly. The loading assembly is for receiving a peripheral device having two projections protruding from opposite sidewalls of the peripheral device. The loading assembly includes two opposite loading members, and each of the loading members defines a sliding slot. The projections can slide along the sliding slots. The hook assembly cooperates with the projections to fix the peripheral device.

9 Claims, 8 Drawing Sheets

FIXING DEVICE

BACKGROUND

1. Technical Field

The present disclosure relates to fixing devices and, particularly, to a fixing device capable of fixing and separating peripheral devices.

2. Description of Related Art

Various peripheral devices can be provided for an electronic device to supplement functions of the electronic device. However, for quite a few of the peripheral devices, it is not convenient to fix them to the electronic device or separate them from the electronic device. For example, the conventional way of fixing a CD-ROM drive to a computer chassis is below: separating the face panel of the computer chassis from the computer chassis; fixing the CD-ROM drive to the computer chassis; and fixing the face panel to the computer chassis. The way of fixing the CD-ROM drive is trouble and inefficient.

BRIEF DESCRIPTION OF THE DRAWINGS

The components of the drawings are not necessarily drawn to scale, the emphasis instead being placed upon clearly illustrating the principles of a fixing device. Moreover, in the drawings, like reference numerals designate corresponding parts throughout several views.

DETAILED DESCRIPTION

Figure 1:
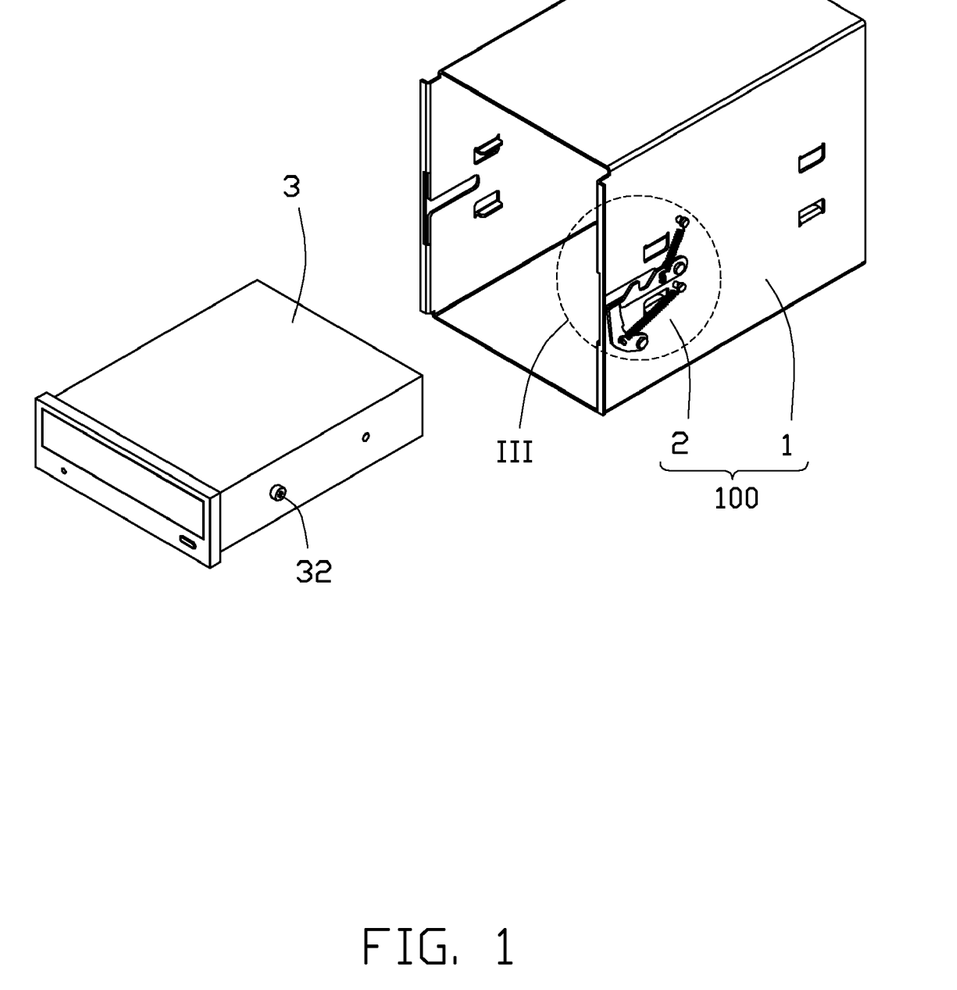
FIG. 1 is an isometric view of the fixing device in accordance with an exemplary embodiment.

Referring to FIG. 1, an embodiment of a fixing device 100 is illustrated. The fixing device 100 includes a loading assembly 1 and at least one hook assembly 2. The loading assembly 1 is configured for receiving a peripheral device 3. In the embodiment, only one hook assembly 2 is employed. In an alternative embodiment, a pair of hook assemblies 2 can be employed. The hook assembly 2 is attached to the loading assembly 1 and is used to fix the peripheral device 3 in the loading assembly 1. In the embodiment, two projections 32 protrude from opposite sidewalls of the peripheral device 3 correspondingly. In the embodiment, one of the projections 32 cooperates with the hook assembly 2 to fix the peripheral device 3. In the embodiment, the loading assembly 1 is a computer chassis. The peripheral device 3 is a CD-ROM drive.

Figure 2:
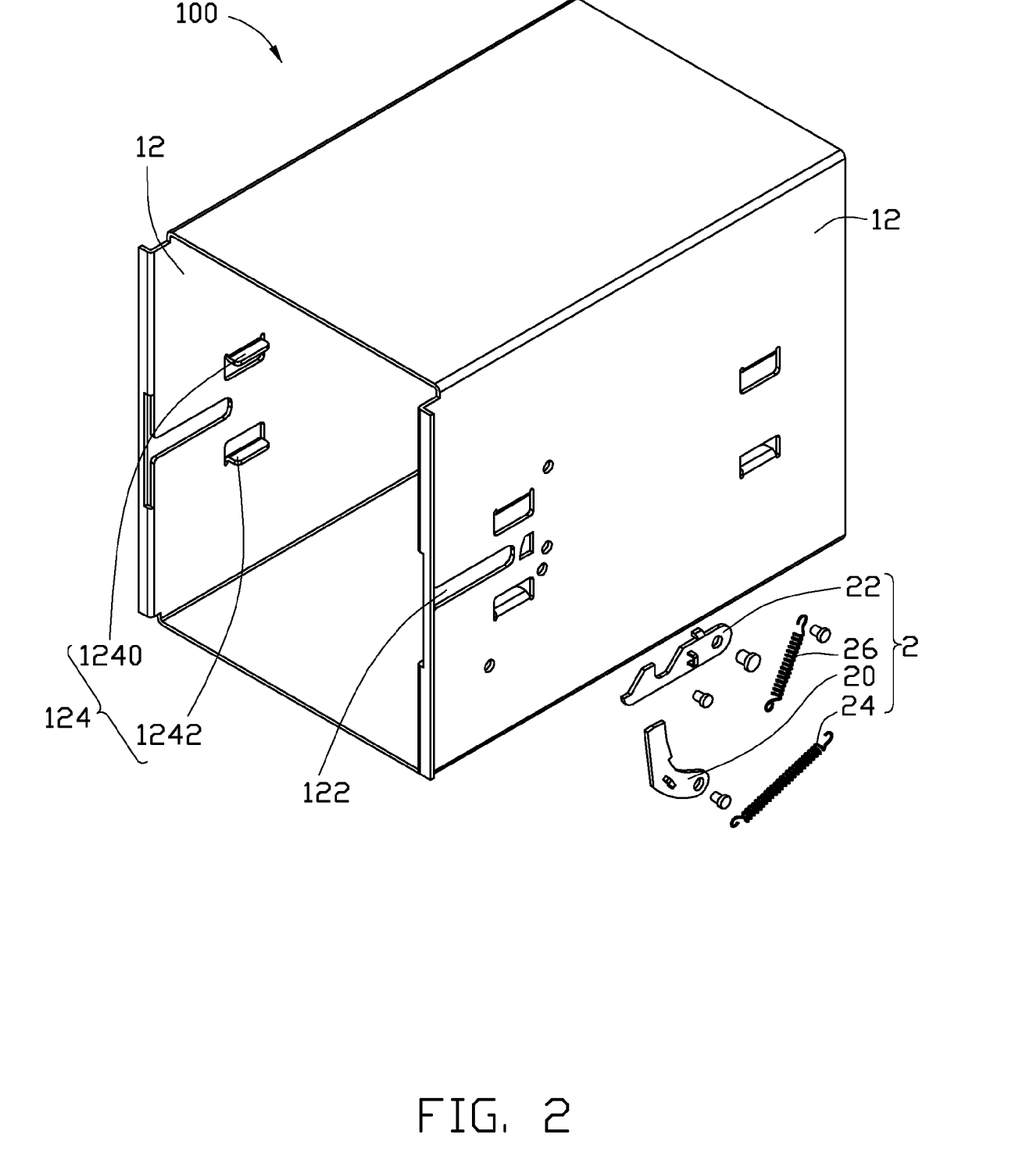
FIG. 2 is an exploded, perspective view of the fixing device of FIG. 1.

Referring also to FIG. 2, the loading assembly 1 includes two loading members 12 on opposite sides of the loading assembly 1. Each of the loading members 12 defines a sliding slot 122. The sliding slot 122 extends along a longitudinal side of the loading member 12 and extends into the loading member 12. An opening (not labeled) is formed on one end of the sliding slot 122. The projection 32 of the peripheral device 3 can slide along the sliding slot 122.

In the embodiment, each of the loading members 12 includes a support member 124 extending to face the other loading member 12 for supporting the peripheral device 3. The support member 124 includes a first support panel 1240 and a second support panel 1242 protruding from the loading member 12. The first support panel 1240 is above the sliding slot 122, and the second support panel 1242 is below the sliding slot 122.

In an alternative embodiment, the sliding slots 122 can cooperate with the projections 32 of the peripheral device 3 to support the peripheral device 3, not by virtue of the support members 124.

Figure 3:
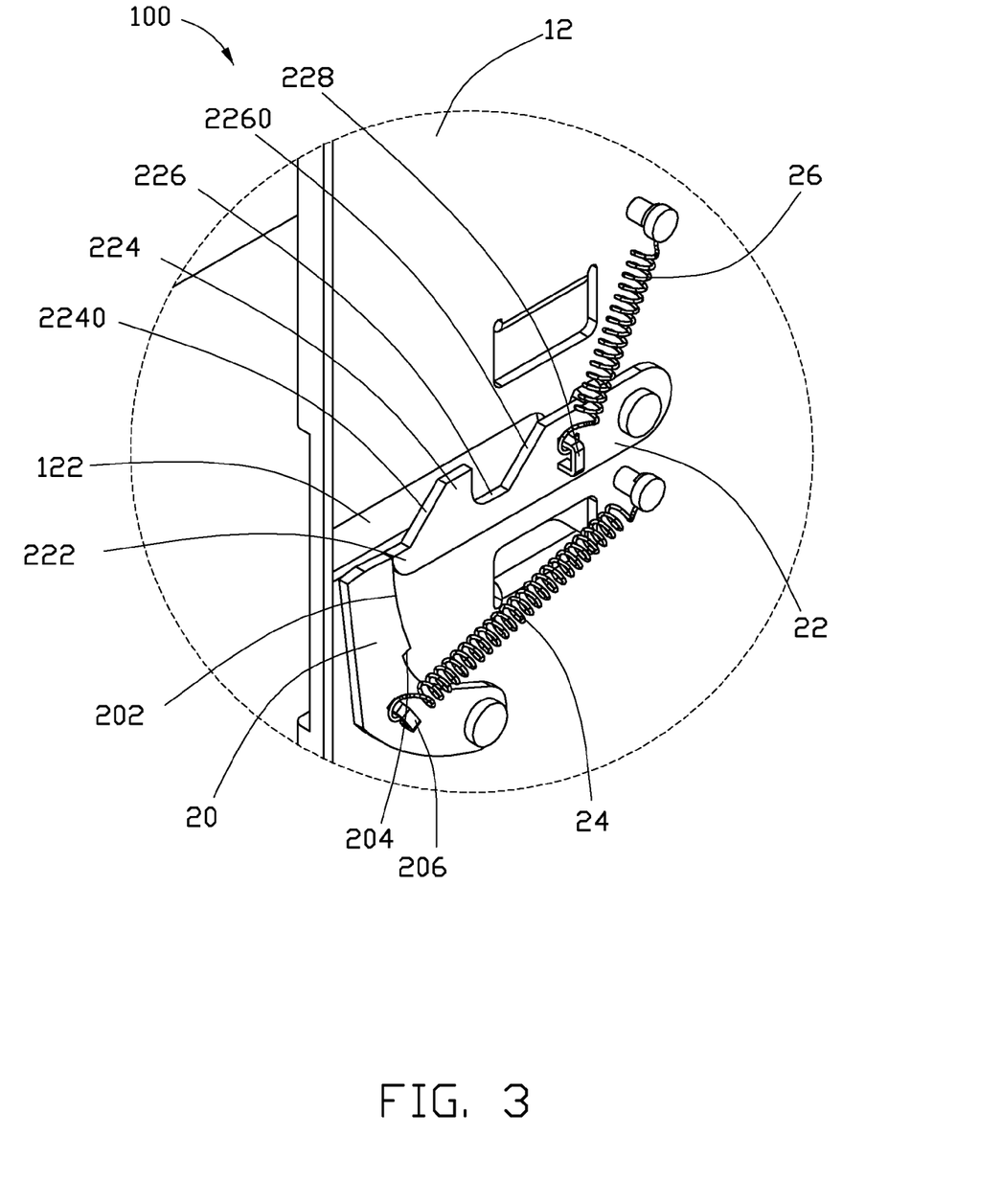
FIG. 3 is a partially enlarged, perspective view of the fixing device of FIG. 1.

Referring also to FIG. 3, the hook assembly 2 includes a first hook member 20, a second hook member 22, a first elastic member 24, and a second elastic member 26. In the embodiment, the first elastic member 24 and the second elastic member 26 are coil springs.

The first hook member 20 is rotatably connected to the loading member 12. One end of the first elastic member 24 is secured to the first hook member 20, and another end is secured to the loading member 12. The top end of the first hook member 20 is driven by the first elastic member 24 to be slightly below the bottom surface of the sliding slot 122.

In the embodiment, the first hook member 20 includes an arcuate sidewall 202. The sidewall 202 extends from the top end of the first hook member 20. A resist portion 204 is formed on another end of the sidewall 202 opposite to the top end. A first fixing portion 206 protrudes from the first hook member 20 for fixing one end of the first elastic member 24.

The second hook member 22 is rotatably connected to the loading member 12. One end of the second elastic member 26 is secured to the second hook member 22, and another end is secured to the loading member 12. The top surface of the second hook member 22 is driven by the second elastic member 26 to be above the bottom surface of the sliding slot 122.

A hook portion 222, corresponding to the resist portion 204, is formed on one end of the second hook member 22. The hook portion 222 resists the sidewall 202 of the first hook member 20, and the top surface of the hook portion 222 is slightly below the bottom surface of the sliding slot 122. A convex stage 224 is formed on the top surface of the second hook member 22. The convex stage 224 includes a first inclined sidewall 2240. The first inclined sidewall 2240 is connected to the hook portion 222. The degree between he first inclined sidewall 2240 and the top surface of the hook portion 222 is larger than 90 degree. A recessed portion 226 is further formed on the top surface of the second hook member 22 adjacent to the convex stage 224. The recessed portion 226 includes a second inclined sidewall 2260. The second inclined sidewall 2260 is away from the convex stage 224 and substantially parallel with the first inclined sidewall of the convex stage 224. A second fixing portion 228 protrudes from the second hook member 22 for fixing one end of the second elastic member 26.

Figure 4:
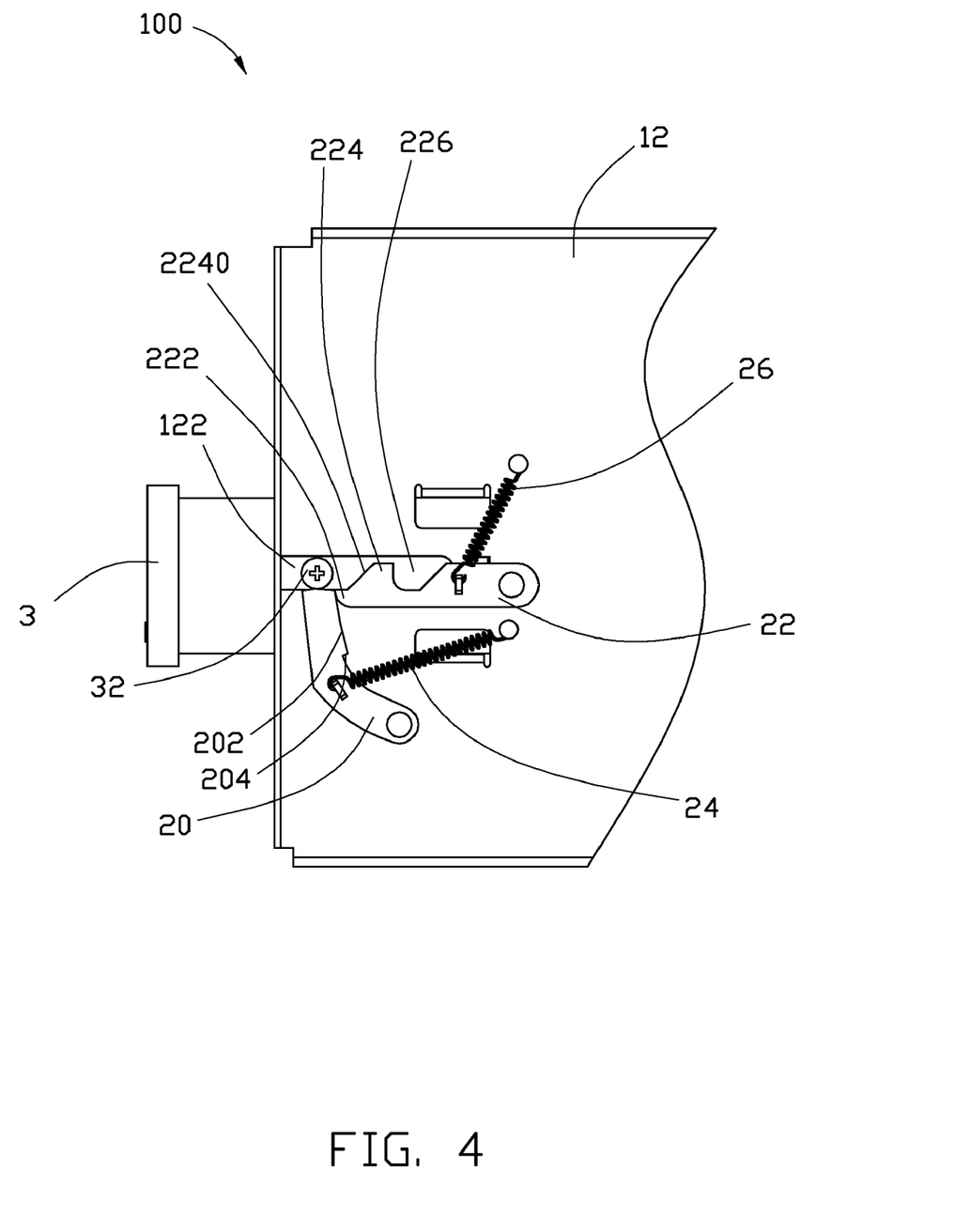
FIGS. 4-6 are a partially enlarged, side view of the fixing device of FIG. 1, showing the fixing device employed to fix a peripheral device.
Figure 5:
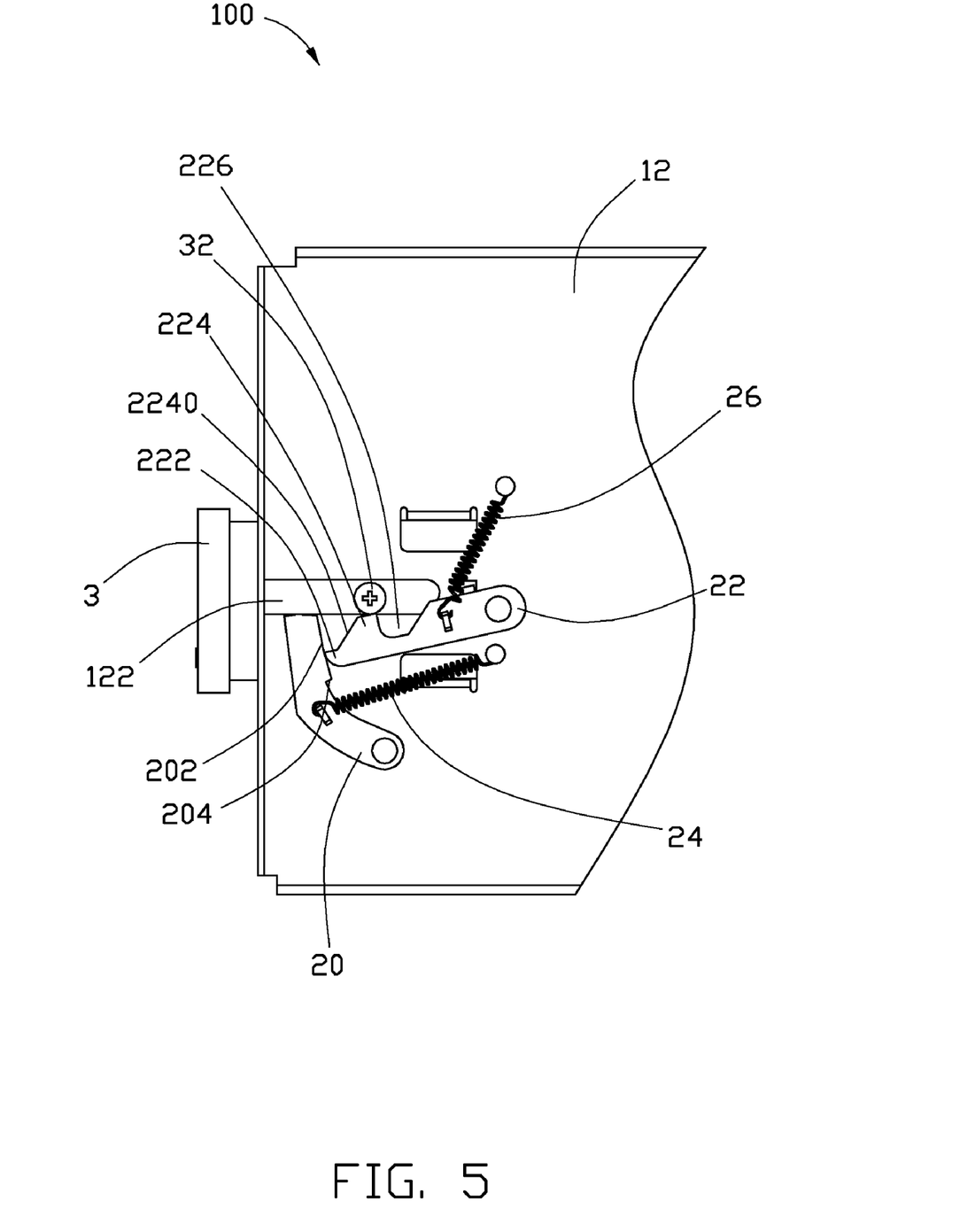
Figure 6:
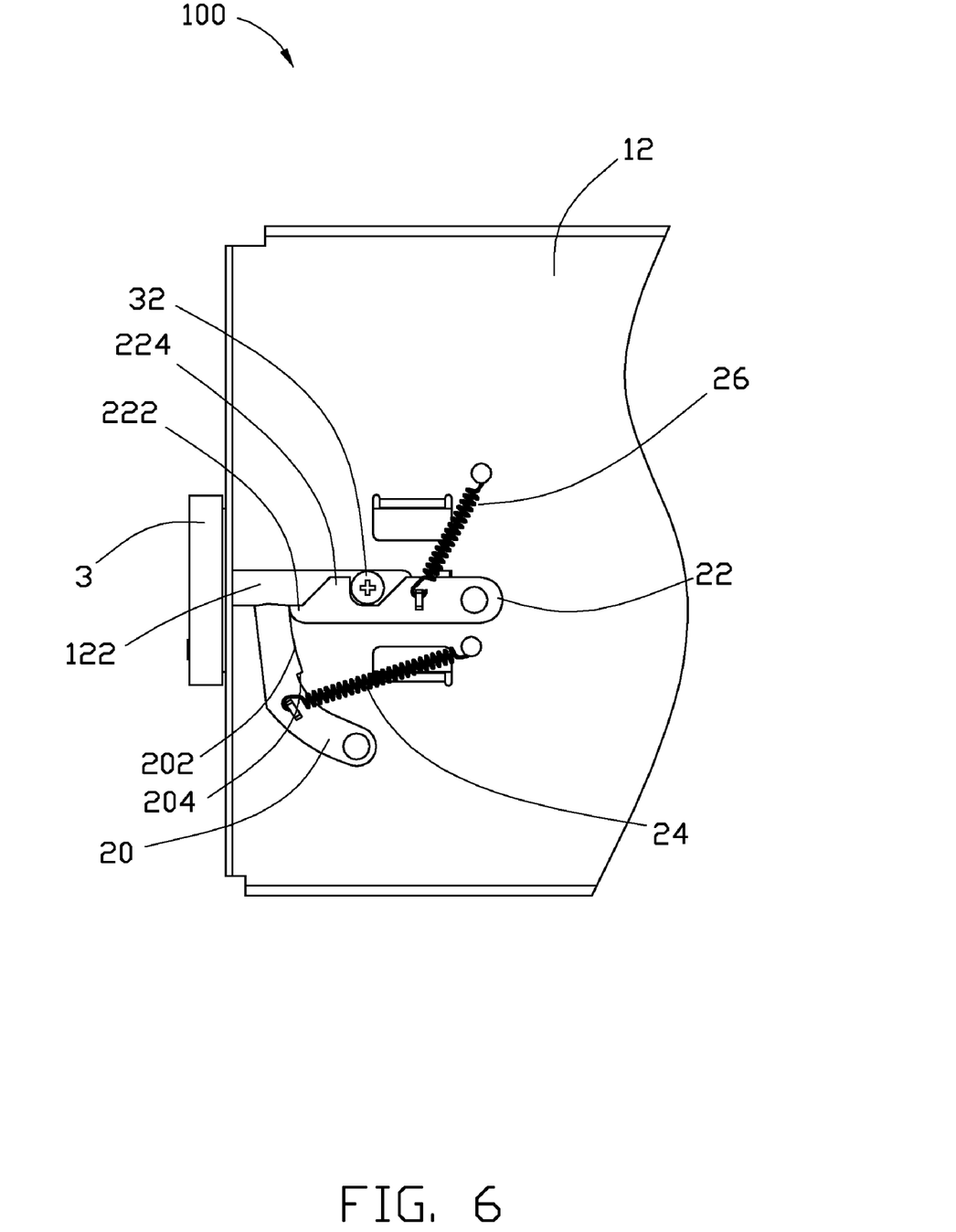

FIGS. 4-6 are for illustrating the procedure of employing the fixing device 100 to fix the peripheral device 3. The procedure mainly includes the following steps: pushing the peripheral device 3 into the loading assembly 1 and sliding each of the projections 32 into the sliding slots 122 via the openings of the sliding slots 122; pushing the peripheral device 3 continually until the projection 32 resists the first inclined sidewall 2240; pushing the peripheral device 3 continually till the top surface of the convex stage 224 is pressed below the bottom surface of the sliding slot 122; and pushing the peripheral device 3 continually until the projection 32 slides into the recessed portion 226. When the projection 32 presses the first inclined sidewall 2240, the hook portion 222 slides along the sidewall 202 of the first hook member 20, and the second elastic member 26 extends. When the projection 32 is received in the recessed portion 226, the second elastic member 26 returns to normal. The second hook member 22 resumes its original state under the spring force of the second elastic member 26, fixing the peripheral device 3.

Figure 7:
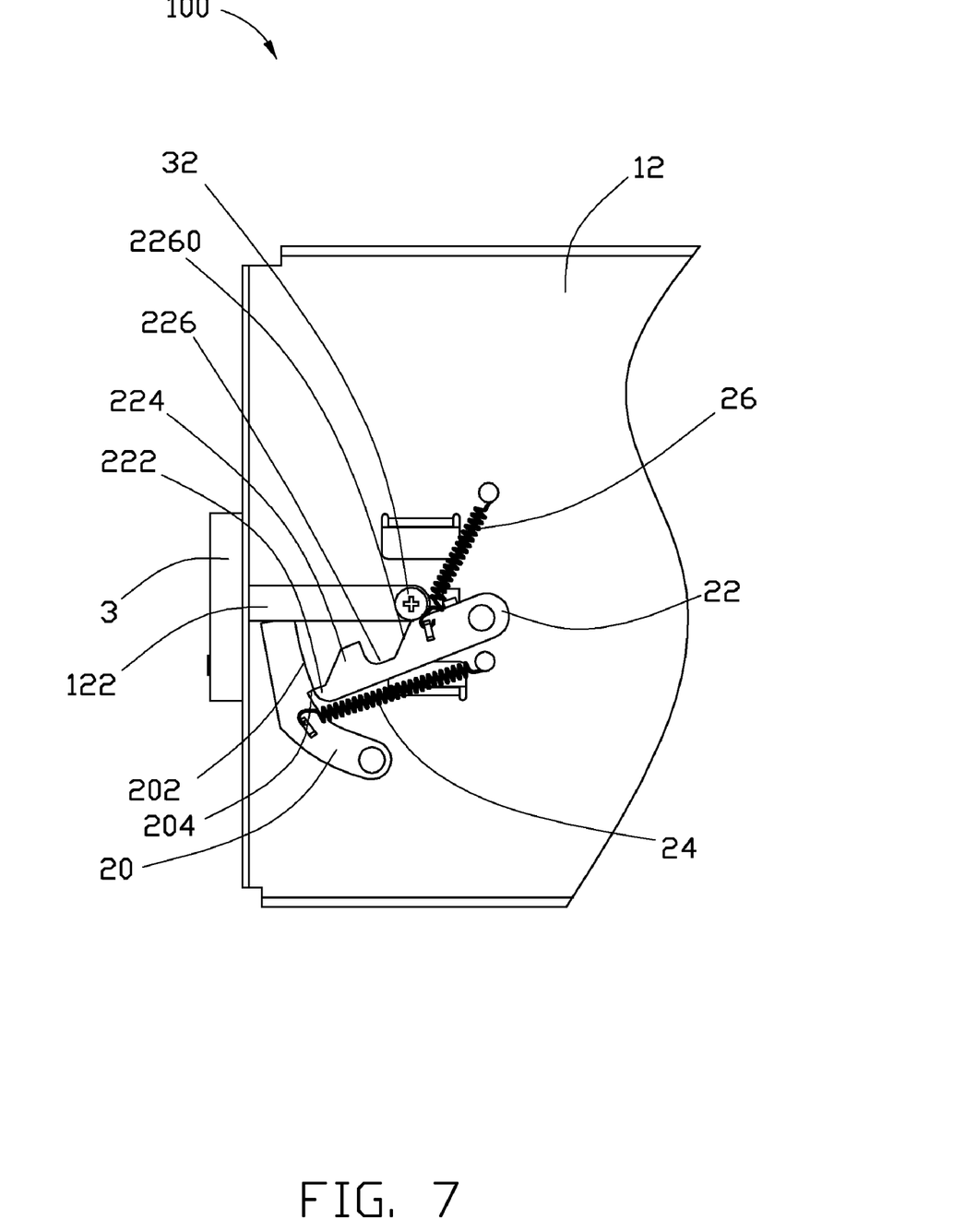
FIGS. 7-8 are a partially enlarged, side view of the fixing device of FIG. 1, showing the fixing device employed to separate the peripheral device.
Figure 8:
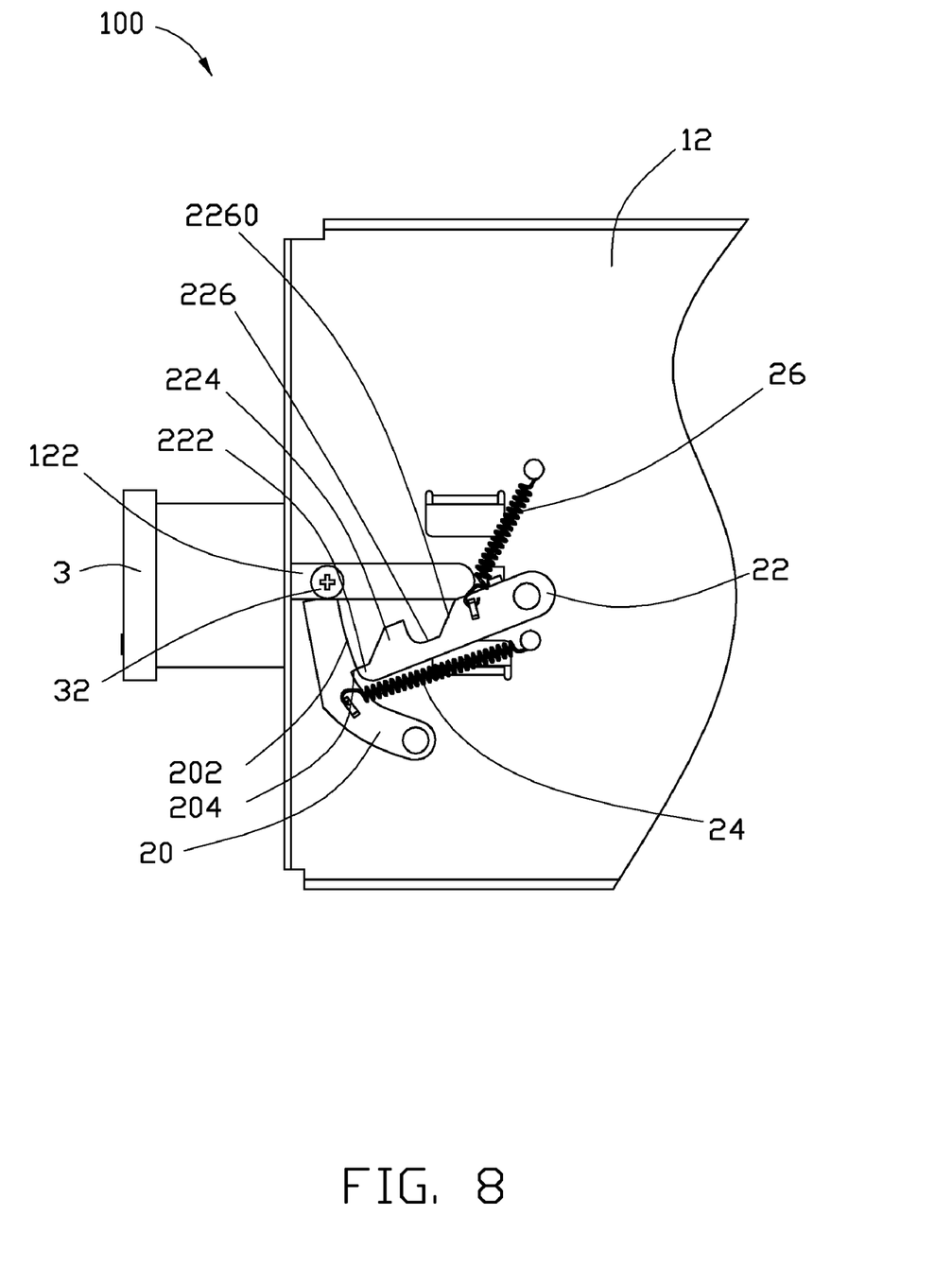

FIGS. 7-8 are for illustrating the procedure of employing the fixing device 100 to separate the peripheral device 3. The procedure mainly includes the following steps: pushing the peripheral device 3 continually until the projection 32 resists the second inclined sidewall 2260 of the second hook member 22; and pushing the peripheral device 3 continually until the top surface of the second hook member 22 is below the bottom surface of the sliding slot 122. When the projection 32 presses the second inclined sidewall 2260, the hook portion 222 slides along the sidewall 202. When the top surface of the second hook member 22 is below the bottom surface of the sliding slot 122, the hook portion 222 hooks the resist portion 204, thus the second hook member 22 is fixed, and the peripheral device 3 can be pulled out from the loading member 1.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A fixing device comprising:
    a loading assembly configured for receiving a peripheral device having projections protruding from opposite sidewalls of the peripheral device, wherein the loading assembly comprises opposite loading members, each of the loading members defines a sliding slot, the sliding slot extends from a side of the loading member and into the loading member, and the projections are able to slide along the sliding slots; and
    at least one hook assembly comprising a first hook member, a second hook member, a first elastic member, and a second elastic member, wherein the first hook member is rotatably connected to the loading member, one end of the first elastic member is secured to the first hook member, and another end of the first elastic member is secured to the loading member, the second hook member is rotatably connected to the loading member, one end of the second elastic member is secured to the second hook member, and another end of the second elastic member is secured to the loading member; the top end of the first hook member is driven by the first elastic member to be substantially at the same level with the bottom surface of the sliding slot, and a resist portion is formed on the first hook member; and the top surface of the second hook member is driven by the second elastic member to be above the bottom surface of the sliding slot, a hook portion corresponding to the resist portion is formed on one end of the second hook member and resists the first hook member, the top surface of the hook portion is substantially at the same level with the bottom surface of the sliding slot, and a recessed portion is formed on the top surface of the second elastic member for receiving the projection of the peripheral device; wherein when the projection of the peripheral device is received in the recessed portion, the peripheral device is fixed to the loading assembly; and when the hook portion of the second hook member hooks the resist portion of the first hook member, the peripheral device can be pulled out from the loading assembly.

2. The fixing device as described in claim 1, wherein the first hook member comprises an arcuate sidewall extending from the top end of the first hook member to the resist portion of the first hook member; and the hook portion of the second hook member resists the arcuate sidewall.

3. The fixing device as described in claim 2, wherein a convex stage is formed on the top surface of the second hook member adjacent to the hook portion and the recessed portion, the convex stage comprises a first inclined sidewall secured to the hook portion.

4. The fixing device as described in claim 3, wherein the degree between the first inclined sidewall of the convex stage and the top surface of the hook portion is larger than 90 degree.

5. The fixing device as described in claim 4, wherein the recessed portion comprises a second inclined sidewall, the second inclined sidewall is away from the convex stage and substantially parallel with the first inclined sidewall.

6. The fixing device as described in claim 5, wherein when the first inclined sidewall of the convex stage is pressed by the projection of the peripheral device, the hook portion of the second hook member slides along the arcuate sidewall of the first hook member, and when the top surface of the convex stage is substantially at the same level with the bottom surface of the sliding slot, the projection of the peripheral device can be pushed to be received in the recessed portion of the second hook member.

7. The fixing device as described in claim 6, wherein when the second inclined sidewall of the recessed portion is pressed by the projection of the peripheral device, the hook portion of the second hook member slides along the arcuate sidewall of the first hook member until the hook portion hooks the resist portion.

8. The fixing device as described in claim 1, wherein each of the loading members comprises a support member for supporting the peripheral device received in the loading assembly.

9. The fixing device as described in claim 8, wherein each of the support members comprises a first support panel and a second support panel protruding from the loading member, the first support panel is above the sliding slot, and the second support panel is below the sliding slot.

* * * * *